Sept. 25, 1956
B. SPENCER, JR., ET AL
2,763,977
CUTTING ATTACHMENT FOR TRACTORS
Filed April 9, 1953
3 Sheets—Sheet 2
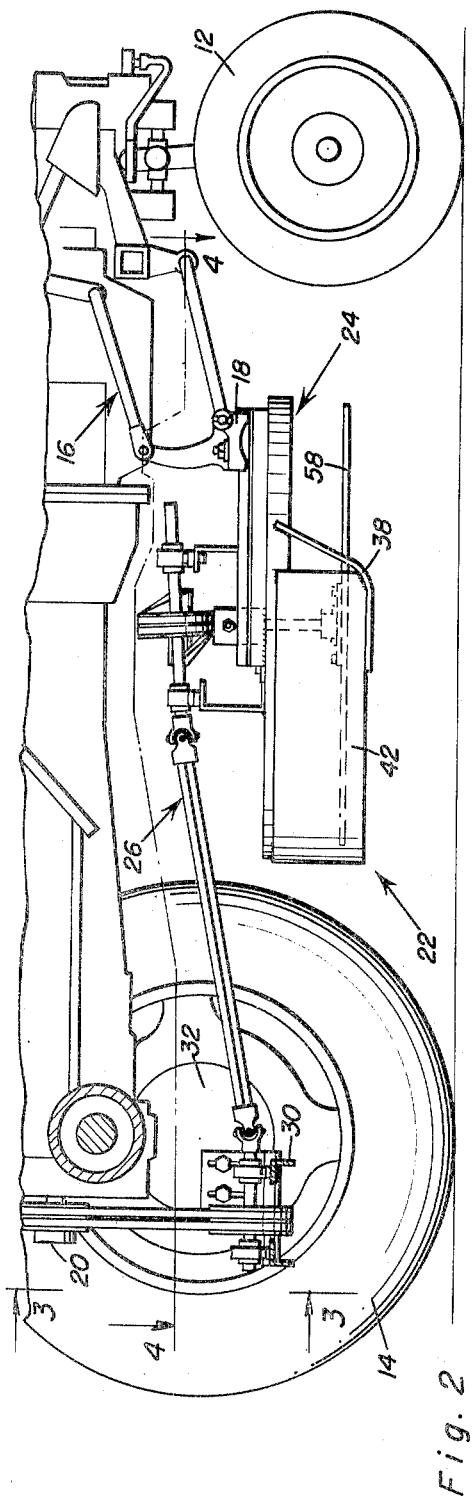
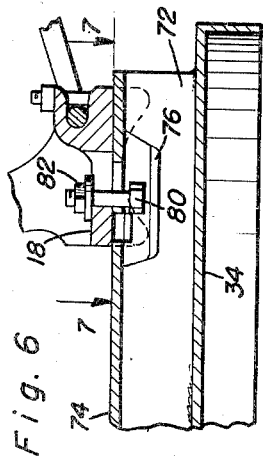
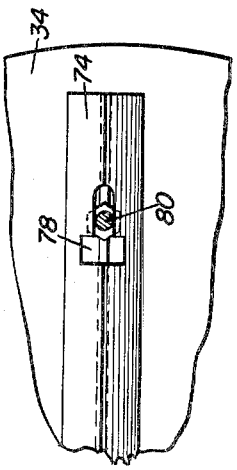
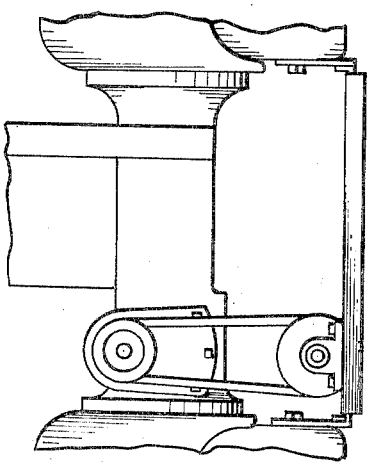
Barnard Spencer, Jr.
Leon G. Brinson
INVENTORS
BY Clarence A. O'Brien
and Harvey B. Jacobson
Attorneys

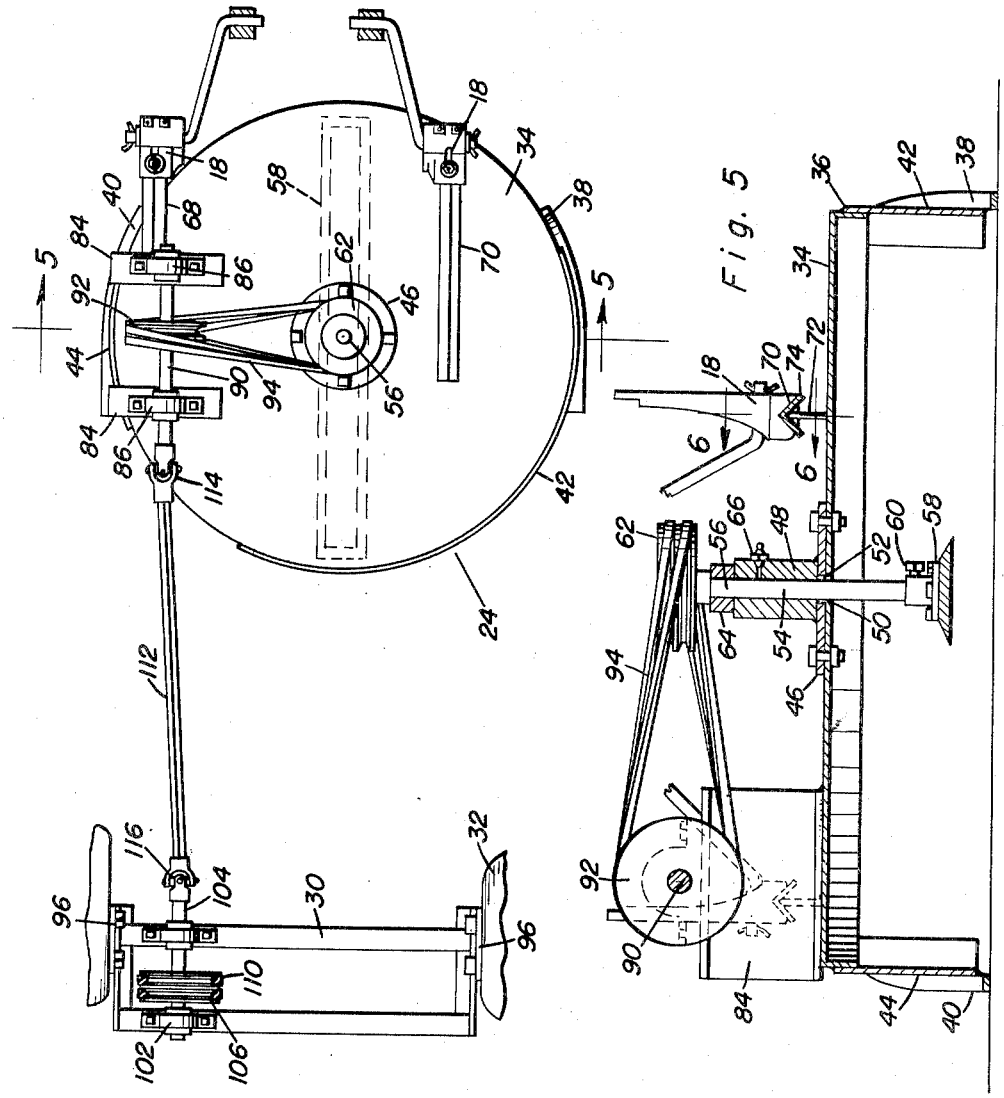

United States Patent Office 2,763,977
Patented Sept. 25, 1956

2,763,977

CUTTING ATTACHMENT FOR TRACTORS

Barnard Spencer, Jr., and Leon G. Brinson,
Gainesville, Fla.

Application April 9, 1953, Serial No. 347,662

1 Claim. (Cl. 56—25.4)

The present invention relates to a novel rotary cutting attachment for tractors and the like.

A primary object of the invention is to provide a rotary cutting attachment that may be carried by the lift assembly of a tractor and driven by the tractor power take off.

Another very important object of this invention is to provide a cutting attachment of the character described that includes a simple nad quickly attachable mounting means for attachment to the tractor lift assembly which requires no modification of the lift assembly and no special tools and which permits the raising and lowering of the attachment in response to movement of the lift assembly.

Still another important object of the invention resides in the provision of a novel arrangement for establishing a flexible driving connection between the power take off of a tractor and the rotary cutter that will permit the raising and lowering of the cutter attachment without interruption of the rotation of the cutter.

Yet another object of the invention resides in the provision of a novel frame for mounting the driving attachment adjacent the rear end of the tractor and underneath the power take off which is in itself capable of vertical adjustment and which will in no manner interfere with the operation with either the tractor or the movement of the rotary cutter.

These, together with various ancillary objects and features which will later become more apparent as the following description proceeds are attained by this invention, a preferred embodiment of which is shown by way of example only in the accompanying drawings, wherein:

Figure 2 is a view similar to Figure 1 with parts being broken away showing the cutter attachment raised by the lift assembly of the tractor;

Figure 3 is a sectional view of a portion of the driving connection to the tractor power take off taken substantially along section line 3—3 of Figure 2;

Figure 4 is a top elevational view of the rotary cutter attachment per se showing the construction and method of mounting the same;

Figure 5 is an enlarged sectional view along the disc of the rotary cutter taken substantially along section line 5—5 of Figure 4;

Figure 6 is an enlarged sectional view taken substantially along section line 6—6 of Figure 5 showing the detailed mounting of the rotary cutter attachment to the tool bar clamps on the lift frame or assembly of the tractor; and, Figure 7 is a top view of the mounting means taken substantially along section line 7—7 of Figure 6.

Reference will now be had to the accompanying drawings in detail wherein like reference numerals are utilized to designate similar parts throughout the various views.

Figure 1:
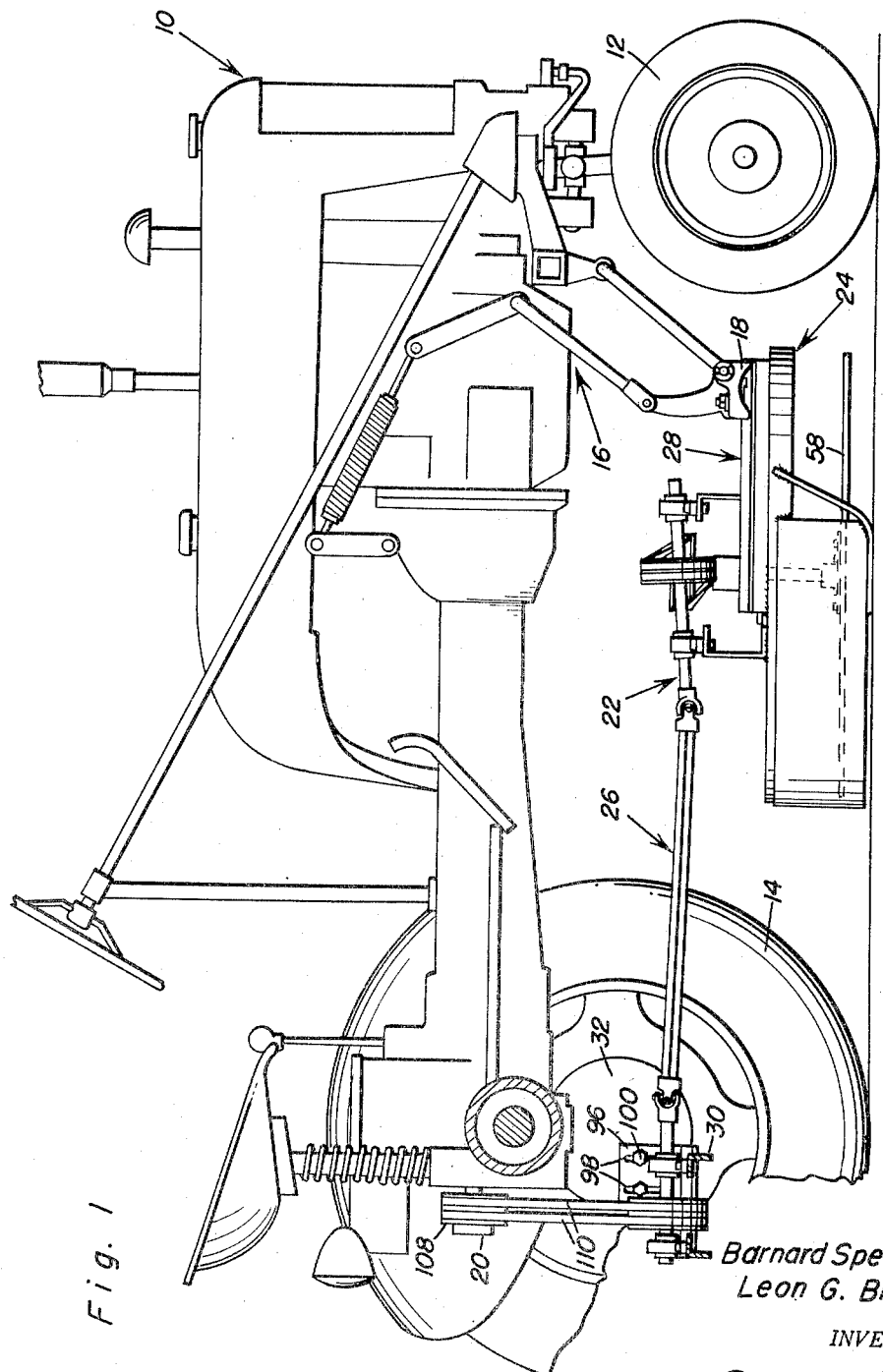
Figure 1 is a side elevational view of a tractor with the rotary cutting attachment mounted thereon.

In Figure 1 is shown a tractor 10 of conventional variety having front wheels 12, rear wheels 14 and power take off shaft 20 extending from the rear end thereof between the rear wheels 14. Also carried by the tractor 10 between the front and rear ends thereof is a conventional lift assembly 16 terminating at its lower end in a pair of tool bar clamps 18. In Figure 1, the lift assembly 16 is shown in its lowered position with the tool bar clamps 18 being relatively close to the ground surface.

Suspended beneath the tractor 10 is a rotary cutter attachment illustrated generically by the numeral 22. The attachment 22 consists essentially of two parts, namely the rotary cutter 24 and the rotary cutter drive means 26. The cutter 24 is suspended by the mounting means 28 from the tool bar clamps 18 of the lift assembly and a portion of the drive means 26 is carried on the cutter 24. The balance of the attachment drive means 26 is carried on a frame 30 which is suspended from the brake drum housings 32 of the tractor rear wheels 14 beneath the power take off shaft 20.

As will be noted from an inspection of Figures 1 and 2, the drive means 26 for connecting the cutter 24 to the power take off of the tractor is flexible whereby the driving connection through the cutter will be maintained where the cutter is in lowered position as shown in Figure 1 or raised position as shown in Figure 2. Obviously, with this arrangement, growths may be cut at varying heights according to the desires of the tractor operator.

In Figures 1, 2, 4 and 5, the rotary cutter 24 may be most readily observed. The cutter 24 comprises a mounting plate 34 in the form of a flat disc. The flat disc 34 has a downturned peripheral flange 36. Skid bars 38 and 40 are suspended from the peripheral flange 36 so as to be disposed at substantially diametrically opposite portions of the mounting disc 34. A side plate 42 is secured to a portion of the flange 36 and extends circumferentially around what will be termed for convenience the rear portion of the disc. The forward end of the side plate 42 rests upon the skid bar 38 and is secured thereto by any suitable means. A second side plate 44 is suspended from another portion of the peripheral flange 36 and has its forward end resting upon and secured to the skid bar 40. The rear end of the side plate 44 terminates circumferentially spaced from the rear end of the first mentioned side plate 42.

Mounted centrally on the top of the disc 34 is a reinforcing plate 46. An upstanding boss 48 is mounted on the reinforcing member 46. Aligned apertures 50 and 52 are provided in the plate 34 and the reinforcing plate 46 respectively, which apertures are in registry with the bore 54 of the boss 48. The rotary cutter shaft 56 is journaled through the aligned apertures and bore of the boss. At the lower end of the cutter shaft 56 beneath the disc 34 the rotary cutting blades 58 are secured by means of the collar 60. On the upper end of the rotary shaft 56 is secured a double-belt pulley 62. Spacing washer 64 is inserted between the top of the boss 48 and the pulley 62. A lubrication orifice for the cutter shaft 56 is provided in the side wall of the boss 48 and is designated by the numeral 66.

The mounting means 28 for securing the disc 34 to the lift assembly or frame 16 of the tractor consists of a pair of mounting brackets which are secured to the top surface of the disc 34 on opposite sides and forwardly of the cutter shaft 56. Mounting bracket 70 is disposed closer to the central portion of the disc than is mounting bracket 68 so that the cutter disc 34 will be disposed slightly offset to the longitudinal axis of the tractor when the mounting brackets 68 and 70 are secured to the tool bar clamps 18 on the lift frame 16.

Each of the mounting brackets 68 and 70 is formed so that it may be directly attached to the tool bar clamp 18 without any modification in the tool bar clamp structure. Noting Figures 5–7, the mounting bracket 70 will be clearly observed. Since the bracket 70 and the bracket 68 are constructed of identical members, a description of one will serve for both. Observing these figures, it will be seen that the mounting bracket 70 comprises a longitudinally extending bar 72 having one longitudinal edge thereof secured to the top surface of the disc 34 so that the width of the bar 72 is perpendicular to the plane of the surface of the disc 34. The upper longitudinal edge of the bar 72 has an angle iron 74 secured thereto at the juncture of the legs of the angle iron so that the bracket 70 appears substantially T-shaped in cross-section. At the forward end of the bar 72 is an upwardly opening notch 76. The portion of the angle iron 74 overlying this notch is provided with a keyhole slot 78. A fastener 80 in the form of a bolt is disposed in the keyhole slot and pressed forwardly so that the head of the bolt rests between the legs of the angle iron 74. The shank of the bolt projects through the keyhole slot 78 through the opening in the tool bar clamp 18 and a nut 82 on the free end of the bolt shank clamps the angle iron 74 into position on the clamp 18. Thus, the cutter disc 34 is securely fixed to the lift frame 16 whereby the same may be raised and lowered upon actuation of the lift frame and which yet may be quickly and easily detached therefrom.

To provide an uninterrupted drive for the cutter shaft 56, the flexible drive 26 is provided which may conveniently be divided into two sections, one of which is secured directly to the upper surface of the cutter disc 34 and the other of which is secured to the rear wheel brake drum housing casings 32.

Said portion of the drive means 26 mounted on the cutter disc 34 comprises basically a pair of structural members 84 longitudinally spaced on the top of the disc 34 adjacent the periphery thereof to provide a base for the bearing members 86 which are mounted thereon. A shaft 90, forming a portion of the over-all drive shaft of the drive means 26, extends between the structural members 84 and has its ends journaled in the bearings 86. Intermediate its ends is secured a double-belt pulley 92 and a pair of endless belts 94 are entrained over the pulleys 62 and 92 respectively. It is to be noted in this connection that double pulleys and belts are used because of their inherent strength and that it is within the scope of the invention to use single pulleys and belts or other equivalent drive means. The frame 30 extends transversely of the longitudinal axis of the tractor and includes the suspension or supporting brackets 96 at its opposite ends. These suspension brackets 96 are provided with vertical slots 98 and fasteners 100 vertically adjustably secure the suspension brackets 96 from the brake drum casings 32 on the rear wheels 14 of the tractor. Bearings 102 longitudinally spaced along the frame journal the shaft 104, which forms another portion of the cutter drive shaft, on the frame 30. Double-belt pulley 106 secured to the shaft 104 intermediate its ends interconnects the shaft with the power take off pulley 108 of the tractor by means of the endless belts 110. A connecting shaft 112 extends between the shafts 90 and 104 and is connected to the shafts by universal joints 114 and 116 respectively at each of its ends. Thus, shafts 90, 104 and 112 complete the drive shaft for rotating the cutter shaft 56 and consequently the cutter blades 58. By means of this flexible drive shaft, the raising and lowering movement of the disc 34 does not interfere with the driving connection from the power take off to the cutter blades 58; nor is the mounting of the entire cutting attachment 22 so complex as to cause any difficulty in either its attachment to or removal from the tractor.

Thus, it is submitted that the present invention provides a simple and effective rotary cutting attachment that will materially assist farmers and others in mowing and other cutting operations.

Since numerous minor changes will readily occur to those skilled in the art after a perusal of the foregoing specification taken in conjunction with the accompanying drawings, it is not desired to limit the invention to the exact construction shown and described. But, all suitable modifications may be resorted to which fall within the scope of the appended claims.

What is claimed as new is as follows:

A rotary cutting attachment for tractors comprising a substantially flat disc adapted to be suspended from a tractor lift assembly having laterally spaced clamps, rotary cutting means carried by said disc, drive means operatively connected to said cutting means and adapted to be connected to the power take off of a tractor, and mounting means for suspending the disc from the tractor lift assembly, said mounting means comprising a pair of mounting brackets secured to the top surface of the discs on opposite sides thereof, said rotary cutting means including a rotary shaft journaled centrally through said disc, said mounting brackets being disposed forwardly of said rotary shaft and spaced apart in correspondence with said clamps, each of said mounting brackets comprising an elongated member secured at one longitudinal edge to said disc, an angle member disposed parallel to said elongated member and being secured along the juncture of its legs to the other longitudinal edge of said elongated member, said angle member and said elongated member having registering openings therein through which a fastener projects, for attachment to said clamps, said mounting brackets being spaced different distances from the axis of the disk to offset said disk outwardly of said tractor lift assembly.

References Cited in the file of this patent

UNITED STATES PATENTS

| | | |
|---|---|---|
| 2,272,436 | Seright | Feb. 10, 1942 |
| 2,502,468 | Marihart | Apr. 4, 1950 |
| 2,592,991 | Yeager et al. | Apr. 15, 1952 |
| 2,634,571 | Lawrence et al. | Apr. 14, 1953 |
| 2,696,704 | Bjork | Dec. 14, 1954 |

OTHER REFERENCES

Popular Mechanics, May 1950, page 109.